United States Patent Office 3,503,922
Patented Mar. 31, 1970

3,503,922
PROCESS FOR PRODUCING DISPERSIONS OF FINELY - DIVIDED SOLIDS IN ISOTACTIC POLYPROPYLENE
Edwin B. Carton, Newtonville, Mass., assignor, by mesne assignments, to Polymer Dispersions, Inc., New York, N.Y., a corporation of Ohio
No Drawing. Filed July 15, 1965, Ser. No. 472,349
Int. Cl. C08f 47/00, 45/08, 29/12
U.S. Cl. 260—41     3 Claims

ABSTRACT OF THE DISCLOSURE

An improved method of dispersing particulate solids in isotactic polypropylene comprising dispersing the finely divided solid into polymeric material chosen from the group consisting of polyethylene, atactic polypropylene, polystyrene, polybutene, ethylene/vinyl acetate copolymer, ethylene/propylene copolymers, and mixtures thereof to provide a super-concentrate comprising at least 20 percent of the solid and reducing the super-concentrate by admixing therewith sufficient isotactic polypropylene to provide a dispersion comprising between 0.1 and 55 weight percent of the solid.

---

The present invention relates to improved methods for dispersing particulate solids into olefinic polymeric materials and in particular relates to an improved method for dispersing particulate solids in isotactic polypropylene.

Stereoregular or isotactic polypropylene is a well-known and valuable polymeric material in the plastics industry. Various methods for the mixing and ultimate dispersion of particulate solids such as carbon black, titanium dioxide, silicon dioxide, mica, talc, and the like into polymeric materials such as polypropylene are known. For example, particulate solids can be dispersed into said materials by mechanical working of the particulate solid into a polymeric melt such as by utilization of a hot roll mill and/or Banbury type mixer. In general, the initial step in preparation of a solid/polymeric dispersion is the production of a "masterbatch" or "superconcentrate" which is a polymeric composition comprising a high proportion of particulate solid dispersed in the polymer. After production the superconcentrate is reduced or diluted in a "let-down" step to the desired concentration of particulate solid. It is obviously important in the interests of product quality that the particulate solid be uniformly dispersed throughout the polymer matrix.

As is well known in the art, one of the problems that has been often encountered in the dispersion of particulate solids in isotactic polypropylene polymers resides in the tendency of isotactic polypropylene to degrade during dispersion operations. Said degradation is thought to be caused by the extensive shear and temperature history to which said polymers must generally be subjected in order to provide good dispersion of the particulate solid therein. Said degradation is extremely deleterious with respect to product quality. For example, when degradation of isotactic polypropylene occurs during dispersion of carbon black therein, the resulting dispersion is generally characterized by discoloration of the polypropylene and/or the presence of substantial number of large agglomerates comprising carbon black. Said agglomerates result in imperfections such as pits, scrapes, comets, tears and the like on the surfaces of end products formed from said dispersion. In accordance with the present invention, however, this problem has been largely eliminated.

Accordingly, it is a principal object of the present invention to provide improved isotactic polypropylene/particulate solid dispersions.

It is another object of the present invention to provide a novel process for the production of improved dispersions comprising isotactic polypropylene in which degradation of the polypropylene is minimized.

Other objects of the present invention will in part be obvious and will in part appear hereinafter.

In accordance with the present invention, the above and other objects and advantages can be realized when a superconcentrate comprising certain olefinic polymeric materials is prepared following by let-down of said superconcentrate with isotactic polypropylene to the ultimate desired concentration of particulate solid.

For the purposes of present invention a superconcentrate is a polymeric material/particulate solid dispersion comprising at least about 20% by weight thereof of said particulate solid. The upper limit of solids concentration which can be achieved in the superconcentrate will depend to a large extent upon the specific olefinic polymeric material and particulate solid utilized. For instance, when the superconcentrate is to comprise atactic polypropylene and thermal carbon black, as much as about 80% by weight of the superconcentrate can comprise carbon black. Generally, however, solids concentration of between about 35% and about 65% by weight of the superconcentrate are preferred.

It should be noted that the greater the concentration of particulate solid in the superconcentrate, the smaller will be the concentration of polymeric material forming part of said superconcentrate in the final isotactic polypropylene dispersion. Thus, normally the superconcentrate is desirably prepared with as high a concentration of solid as possible provided, of course, that good dispersion of said solid therein is accomplished. Suitable concentrations for any particular polymeric material/particulate solid combination can readily be determined during operations.

Polymeric materials suitable for use in the superconcentrate are polymers and copolymers chosen from the group consisting of polyethylene, polystyrene, polybutene, atactic polypropylene; ethylene/propylene, ethylene/vinyl acetate, copolymers; and mixtures thereof.

The terms "atactic" and "isotactic" are defined as follows: (1) "atactic" refers to polypropylene molecules whose substituents are in substantially random arrangement about the main polymer chains and therefore result in an amorphous polymer structure; (2) "isotactic" refers to polypropylene molecules whose substituents are arranged in an ordered sequence about the main polymer chains and result in a crystalline polymer structure.

The solubility of polypropylene in boiling (at standard pressure) n-heptane is a useful method for determining the relative tacticity of polypropylene polymers. Said method has been set forth, for instance, by Guilio Natta et al., in the Journal of the American Chemical Society, 77, pages 1708–1710, 1955. For the purposes of the present invention, a polypropylene which is at least 75% by weight soluble in boiling n-heptane is considered to be atactic while a polypropylene which is less than about 25% by weight soluble is considered to be isotactic. In a most preferred embodiment of the present invention, the atactic polypropylene representing the polymeric material of the superconcentrate is at least about 90% soluble in boiling n-heptane.

The particulate solids which may be employed in the practice of this invention should be substantially insoluble in the polymers utilized, that is, they should remain as discrete solid materials during and after dispersion. Moreover, the average particle diameter of said solids can range from about 10 to about 300 millimicrons. The advantages of the present invention are generally particularly striking, however, when particulate solids having an average particle diameter of less than about 50 millimicrons are utilized. Specific examples of suitable particulate solids are carbon black, titanium dioxide, silicon dioxide, mica, talc and the like.

As mentioned hereinbefore preparation of the superconcentrate and let down thereof can be accomplished by any suitable means such as by cold or hot roll milling, utilizing internal mixers such as a Banbury mixer, twin-screw extruder, and/or by use of any other suitable dispersion equipment. The particulars concerning operations and equipment utilized to form either the superconcentrate or the final let-down dispersions form no part of the present invention and are generally well known in the art, hence, will not be further discussed here.

Having produced a superconcentrate comprising a certain polymeric material having dispersed therein above about 20% by weight of said superconcentrate of a particulate solid, the superconcentrate is then let-down or diluted to a solids concentration of between about 0.1% and about 55% by weight of the total dispersion with isotactic polypropylene as hereinbefore defined. In particular, isotactic polypropylene which is 99% or more insoluble in boiling n-heptane is preferred. The let-down can be accomplished in a single step or by a series of dilutions of the superconcentrate.

A better understanding of the invention can be obtained from the following examples which, however, should be construed as being illustrative and as not limiting the scope of the invention.

EXAMPLE 1

Into a 1200 gram capacity Banbury mixer there is charged 500 grams of an isotactic polypropylene which is less than about 10% soluble in boiling n-heptane and 500 grams of a channel type carbon black which has an E.M. particle size of about 16 millimicrons. Mixing was started at about 24 p.s.i.g. and a rotor speed of about 116 r.p.m. After about 4 minutes fluxing is achieved and the melt temperature is determined to be about 375° F. The ram is then momentarily raised to dust down any carbon black that has alhered to the sides of the mixer walls and is then again lowered to a pressure of about 24 p.s.i.g. After about 8 minutes of operation at these conditions the resulting superconcentrate is dumped and cooled. About 50 grams of this superconcentrate and an additional 950 grams of a similar isotactic polypropylene is then charged into another 1200 gram capacity Banbury mixer. A mixing cycle as just described in forming the superconcentrate is then again effected. The final dispersion containing about 2½% carbon black is then dumped, cooled, and evaluated as follows:

After cooling, small representative samples of the polypropylene black dispersion are cut into small chips (about 6 Tyler mesh) which are placed on clean, hot microscope slides heated to about 400° F. Other heated microscope slides are placed on top of the samples and the slides are pressed together and pressure maintained for 10–15 seconds. The slides are then cooled and the dispersion samples sandwiched therebetween evaluated microscopically at about 100 diameters magnification. A series of 10 standard slides comprising dispersions of carbon black in polyethylene in serially descending degrees of uniformity are utilized to compare the test compositions. Slide number one represents the most uniform dispersion while slide number six is considered to be representative of the minimum dispersion quality which is commercially acceptable. The average dispersion quality of the test slides is similar to that represented by standard slide number nine and, moreover, each of said test slides is found to contain a substantial number of large aggregates of carbon black.

EXAMPLE 2

This example is a duplicate of Example 1 with the exception that the superconcentrate is prepared with 500 grams of atactic polypropylene having a solubility in boiling n-heptane of about 90% by weight. After let-down the dispersion containing about 2½% carbon black is evaluated as in Example 1 and the average dispersion quality is found to correspond to standard slide number 5 which indicates that the carbon black is sufficiently uniformly dispersed throughout the polypropylene to be commercially acceptable for the production of end products by molding, extruding, etc. Moreover, fewer agglomerates of carbon black are noted in these samples as compared to the dispersion prepared in Example 1.

EXAMPLE 3

This example is a duplicate of Example 1 with the exception that the superconcentrate is prepared with 500 grams of injection molding grade polystyrene having a melt index of about 10. Upon microscopic evaluation, the average quality of the let-down dispersion is found to be intermediate between standard slides 4 and 5. The dispersion is therefore of vastly improved quality and conforms to the specifications required for commercial purposes. Moreover, only a few carbon black agglomerates are noted.

EXAMPLE 4

This example is a duplicate of Example 1 with the exception that the polymeric material utilized in the preparation of the superconcentrate is a low density (.920) polyethylene having a molecular weight of about 50,000. The final let-down dispersion containing about 2½% carbon black is evaluated as mentioned hereinbefore and is found to be similar to standard slide number 5.

We are presently unable to explain precisely why improved isotactic polypropylene dispersions result when a superconcentrate of particulate solid in certain olefinic polymeric materials is prepared and thereafter let-down with isotactic polypropylene. According to one hypothesis we have postulated but to which we do not wish to be bound, we believe that preparation of concentrations of high proportions of particulate solids in said particular olefinic polymeric materials results in improved wetting of the particulate solid without causing agglomeration thereof and without substantial degradation of the polymeric material. This hypothesis appears to be consistent with the belief that the agglomeration of particles which frequently occurs during the dispersion of particulate solids into isotactic polypropylene is caused to a large extent by localized degradation of isotactic polypropylene forming part of the superconcentrate.

Obviously, many modifications in the process of this invention as illustrated in the above examples and description can be made without departing from the scope of the present invention.

For instance, compositions prepared in accordance with the present invention can contain in addition to the particulate solid, antioxidants, surfactants such as calcium stearate, plasticizers, pigments, other fillers, and the like.

Furthermore, polymers and copolymers other than polyethylene and atactic polypropylene can be utilized in forming the superconcentrate such as, for instance, polybutene, ethylene/vinyl acetate copolymer.

Obviously, as mentioned hereinbefore, particulate solids other than carbon black can be utilized in the present invention such as titanium dioxide, silicon dioxide, talc, mica and the like.

Therefore, the scope of the present invention is in no way limited by the examples illustrated above.

What is claimed is:

1. A process for producing improved substantially non-degraded dispersions comprising isotactic polypropylene and a finely-divided solid having an average particle diameter of between about 110 to about 300 millimicrons which comprises dispersing sufficient finely-divided solid into polyethylene to provide a masterbatch comprising at least about 20 weight percent of said solid and reducing said masterbatch by admixing therewith sufficient isotactic polypropylene to provide a dispersion comprising between about 0.1 weight percent and about 55 weight percent of said solid.

2. A process for producing improved substantially non-degraded dispersions comprising isotactic polypropylene and a finely-divided solid having an average particle diameter of between about 10 to about 300 millimicrons which comprises dispersing sufficient finely-divided solid into polystyrene to provide a masterbatch comprising at least about 20 weight percent of said solid and reducing said masterbatch by admixing therewith sufficient isotactic polypropylene to provide a dispersion comprising between about 0.1 weight percent and about 55 weight percent of said solid.

3. A process for producing improved substantially non-degraded dispersions comprising isotactic polypropylene and a finely-divided solid having an average particle diameter of between about 10 to about 300 millimicrons which comprises dispersing sufficient finely-divided solid into ethylene/vinyl acetate copolymer to provide a masterbatch comprising at least about 20 weight percent of said solid and reducing said masterbatch by admixing therewith sufficient isotactic polypropylene to provide a dispersion comprising between about 0.1 weight percent and about 55 weight percent of said solid.

References Cited

UNITED STATES PATENTS 3,135,379  6/1964  Naudain _____ 260—41

FOREIGN PATENTS 879,587  11/1961  Great Britain.
884,142  12/1961  Great Britain.

ALLAN LIEBERMAN, Primary Examiner

U.S. Cl. X.R.

260—897